United States Patent
Risch et al.

(10) Patent No.: US 9,915,799 B2
(45) Date of Patent: Mar. 13, 2018

(54) CENTRAL LOOSE TUBE OPTICAL-FIBER CABLE

(71) Applicants: Prysmian S.p.A., Milan (IT); Brian G. Risch, Granite Falls, NC (US); Denise Collado, Huntersville, NC (US)

(72) Inventors: Brian G. Risch, Granite Falls, NC (US); Denise Collado, Huntersville, NC (US)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 15/518,621

(22) PCT Filed: Oct. 14, 2014

(86) PCT No.: PCT/US2014/060427
§ 371 (c)(1),
(2) Date: Apr. 12, 2017

(87) PCT Pub. No.: WO2016/060647
PCT Pub. Date: Apr. 21, 2016

(65) Prior Publication Data
US 2017/0235069 A1    Aug. 17, 2017

(51) Int. Cl.
*G02B 6/44*    (2006.01)

(52) U.S. Cl.
CPC ......... *G02B 6/4433* (2013.01); *G02B 6/4486* (2013.01)

(58) Field of Classification Search
CPC .................... G02B 6/4433; G02B 6/4486
See application file for complete search history.

(56) References Cited

U.S. PATENT DOCUMENTS

| | | |
|---|---|---|
| 4,892,382 A | 1/1990 | Story et al. |
| 5,109,457 A | 4/1992 | Panuska et al. |
| 5,422,973 A | 6/1995 | Ferguson et al. |
| 6,941,049 B2 | 9/2005 | Risch et al. |
| 7,515,795 B2 | 4/2009 | Overton et al. |
| 7,970,247 B2 | 6/2011 | Barker |
| 8,145,027 B2 | 3/2012 | Overton et al. |
| 8,265,442 B2 | 9/2012 | Overton |
| 8,385,705 B2 | 2/2013 | Overton et al. |
| 8,489,219 B1 | 7/2013 | Strong et al. |

(Continued)

FOREIGN PATENT DOCUMENTS

| | | |
|---|---|---|
| EP | 1324091 A2 | 7/2003 |
| EP | 1489447 A1 | 12/2004 |

(Continued)

OTHER PUBLICATIONS

International Search Report in counterpart International Application No. PCT/US2014/060427 dated Jun. 10, 2015, pp. 1-2.

(Continued)

*Primary Examiner* — Sung Pak
(74) *Attorney, Agent, or Firm* — Additon, Higgins & Pendleton, P.A.

(57) ABSTRACT

The present invention relates to central loose optical-fiber cables. An exemplary optical-fiber cable includes a central buffer tube that encloses loose optical fibers. Stranded strength yarns surround the central buffer tube and the optical fibers positioned within the central buffer tube's annular space, and a cable jacket surrounds the stranded strength yarns.

20 Claims, 1 Drawing Sheet

(56) References Cited

U.S. PATENT DOCUMENTS

| | | | |
|---|---|---|---|
| 2008/0273845 A1 | 11/2008 | Weimann | |
| 2008/0279514 A1* | 11/2008 | Kundis | G02B 6/4402 |
| | | | 385/113 |
| 2012/0014652 A1* | 1/2012 | Parris | G02B 6/4411 |
| | | | 385/111 |

FOREIGN PATENT DOCUMENTS

| | | |
|---|---|---|
| WO | 2009/062131 A1 | 5/2009 |
| WO | 2016/060647 A1 | 4/2016 |

OTHER PUBLICATIONS

Equistar, data sheet "Petrothene GA808091" Linear Low Density Polyethylene, Lyondell Chemical Co., Houston, TX, (2014) pp. 1.
International Search Report & Written Opinion in counterpart International Application No. PCT/US2014/060427 dated Jun. 10, 2015, pp. 1-12.

* cited by examiner

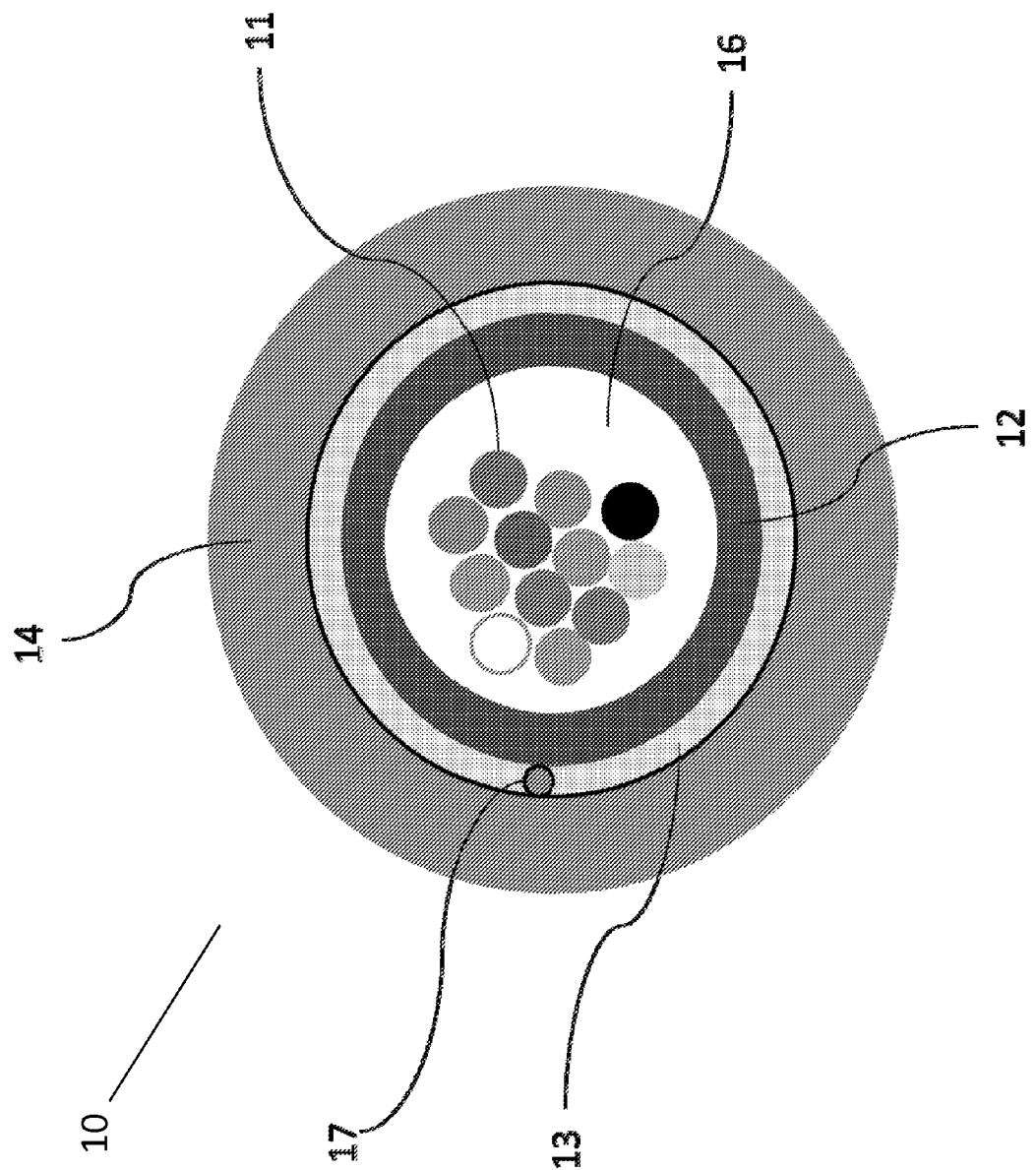

CENTRAL LOOSE TUBE OPTICAL-FIBER CABLE

FIELD OF THE INVENTION

The present invention relates to optical-fiber cables, particularly central loose tube optical-fiber cables.

BACKGROUND

Optical fibers provide advantages over conventional communication lines. As compared with traditional wire-based networks, optical-fiber communication networks can transmit significantly more information at significantly higher speeds. Optical fibers, therefore, are being increasingly employed in communication networks.

Optical fibers are typically grouped in optical-fiber cables, such as central loose-tube cables. Such optical-fiber cables sometimes include rigid strength members to help the optical-fiber cables withstand the mechanical stresses that occur during installation and thereafter as a result of thermal expansion and contraction. Rigid strength members, however, are impractical for cable deployments requiring flexibility and no preferential bending axis. If rigid strength members are not included, loose tube optical-fiber cables are vulnerable to excessive temperature-induced shrinkage (e.g., below freezing, such as between about −20° C. and −40° C.) and optical-fiber attenuation.

Accordingly, a need exists for a central loose tube optical-fiber cable having satisfactory flexibility and strength, while maintaining acceptable optical-fiber attenuation.

SUMMARY

Accordingly, in one aspect, the present invention embraces an optical-fiber cable that includes a non-rigid strength system and jacketing material that limits shrinkage force(s) upon the optical-fiber cable. The non-rigid strength system includes stranded strength yarns that surround a polymeric buffer tube and one or more optical fibers positioned within the polymeric buffer tube's annular space; the optical-fiber cable has no rigid strength members and no preferential bending axis. A cable jacket, which surrounds the stranded strength yarns, has total shrinkage stress of 12 MPa or less at −40° C. (e.g., 11 MPa or less at −40° C.).

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWING

FIG. 1 schematically depicts a cross-sectional view of an exemplary central loose tube optical-fiber cable according to the present invention.

DETAILED DESCRIPTION

FIG. 1 schematically depicts an exemplary, central loose optical-fiber cable 10 that includes a central, polymeric buffer tube 12, which defines an inner wall, and outer wall, and a central, annular space. Optical fibers 11 (e.g., loose optical fibers) are positioned within the polymeric buffer tube's annular space. Stranded strength yarns 13 surround the polymeric buffer tube 12 and the optical fibers 11 positioned within the polymeric buffer tube's annular space, and a cable jacket 14, which defines an inner wall and an outer wall, surrounds the stranded strength yarns 13. As depicted in FIG. 1, the optical-fiber cable has no rigid strength members, such as fiberglass rods. Rather, a layer of stranded strength yarns 13 is typically positioned in the annular space between the polymeric buffer tube's outer wall and the cable jacket's inner wall. Because of this design, the optical-fiber cable has no preferential bending axis, thereby facilitating its installation. At 23° C., the optical-fiber cable typically achieves excess fiber length (EFL) of less than 0.3 percent (e.g., about 0.25), more typically 0.2 percent (e.g., 0.1 percent or less).

A thixotropic material 16 (e.g., grease or grease-like gels) is typically included within the central, annular space defined by the buffer tube 12. The thixotropic material 16 at least partially fills the space between the buffer tube's inner wall and the enclosed optical fibers 11. For example, at least partially filling the free space inside the buffer tube 12 with water-blocking, petroleum-based filling grease helps to block the ingress and transport of water. Further, the thixotropic filling grease helps to couple mechanically (i.e., viscously) the optical fibers to the surrounding buffer tube.

Alternatively, water-blocking elements (e.g., water-swellable yarns and/or water-swellable tapes) may be positioned within the buffer tube's annular space. For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube (e.g., via adhesion, friction, and/or compression). Exemplary water-swellable elements are disclosed in commonly assigned U.S. Pat. No. 7,515,795, which is hereby incorporated by reference in its entirety.

To facilitate access to the optical fibers, one or more ripcords 17 may be positioned between the buffer tube 12 and the surrounding cable jacket 14 as depicted in FIG. 1.

The stranded strength yarns typically include both fiberglass strength yarns and aramid strength yarns. The fiberglass strength yarns typically include between about 3 weight percent and 8 weight percent polymers (e.g., about 3.5 to 6 weight percent polymers), which facilitates processing. Aramid strength yarns tend to more flexible than fiberglass strength yarns. The strength yarns typically have elongation of less than 1.0 percent for a load of 300 lbf and/or elongation of less than 0.6 percent for a load of 200 lbf. The strength yarns largely define the load rating for the optical-fiber cable. In some embodiments, the strength yarns have elongation of less than 0.6 percent for a load of 250 lbf or more (e.g., 300 lbf).

Optionally, the strength yarns can be enhanced with water-swellable material to yield water-blocking strength yarns (e.g., water-swellable aramid strength yarns), or water-blocking elements (e.g., water-swellable yarns and/or water-swellable tapes) may be positioned along with the stranded strength yarns within the annular space between the polymeric buffer tube's outer wall and the cable jacket's inner wall. For instance, yarns, nonwovens, fabrics (e.g., tapes), foams, or other materials may contain water-swellable material and/or be coated with water-swellable materials, such as super absorbent polymers (SAPs). Typically, there is little, if any, free space between the strength yarns 13 and either the buffer tube 12 or the cable jacket 14 (i.e., the cable jacket 13 tightly surrounds the strength yarns 13 and the buffer tube 12).

To achieve excellent low-temperature performance in the absence of rigid strength members, the cable jacket is typically formed from thermoplastic, low-shrink jacketing material(s). The cable jacket typically has total shrinkage stress of 12 MPa or less at −40° C. (e.g., 11 MPa or less at −40° C.). The cable jacket typically has modulus of 2000 MPa or less (e.g., 1000 MPa or less), more typically 500 MPa or less. Moreover, the cable jacket is typically formed of a low-shrink polymer having a coefficient of thermal expansion (CTE) of about $140\times10^{-6}/°$ C. or less at 20° C. and/or about $100\times10^{-6}/°$ C. or less at −40° C. (e.g., less than about $75\times10^{-6}/°$ C. at −40° C.). If the cable jacket's shrinkage properties exceed these exemplary thresholds, cable shrinkage at low temperatures may cause excessive optical-fiber attenuation. Exemplary thermoplastic jacketing material(s) suitable include linear low-density polyethylene (LLDPE) or polypropylene-ethylene-octene copolymers.

The cable jacket is typically extruded in a single sheath layer over the stranded strength yarns that surround the polymeric buffer tube's outer wall. That said, it is within the scope of the invention to employ multilayer cable jackets. The cable jacket typically has a circular cross section, but the cable jacket alternatively may have an irregular or non-circular shape (e.g., an oval, trapezoidal, or flat cross-section).

The central buffer tube is typically formed from thermoplastic material(s), such as polyolefins (e.g., polyethylene or polypropylene, such as high-density polyethylene), including fluorinated polyolefins. Exemplary buffer-tube materials include nucleated polyethylene, nucleated polypropylene, or a copolymer or a blend thereof (e.g., polypropylene-ethylene copolymers or polypropylene-ethylene-octene copolymers). The central buffer tube may also be formed from polyester, such as polybutylene terephthalate (PBT), nucleated polybutylene terephthalate, or low-shrink polybutylene terephthalate; nylon, such as polyamide 12 (PA12), amorphous polyamide 12, or polyamide 11; polyvinyl chloride (PVC); halogen-free flame retardant materials (HFRR); urethane polymers, such as urethane acrylates; and/or blends of these and other polymeric materials. In general, the central buffer tube may be formed of one or more layers. The layers may be homogeneous or include mixtures or blends of various materials within each layer. In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material). Exemplary buffer tubes are disclosed in commonly assigned U.S. Pat. No. 7,970,247, which is hereby incorporated by reference in its entirety.

Exemplary buffer tubes with a circular cross section have outer diameters between 2.0 millimeters and 4.0 millimeters (e.g., 2.5-3.5 millimeters) and corresponding inner diameters between 1.2 millimeters and 3.1 millimeters. One exemplary buffer tube with a circular cross section has an inner diameter of 1.4 millimeters or less and an outer diameter of 3.0 millimeters or less. Although buffer tubes typically have a circular cross section, buffer tubes alternatively may have an irregular or non-circular shape (e.g., an oval or trapezoidal cross-section, or a substantially circular cross-section with one or more flat spots).

The cable jacketing materials and/or buffer tube materials may contain additives, such as nucleating agents, flame-retardants, smoke-retardants, antioxidants, UV absorbers, and/or plasticizers.

As noted, the fiberglass strength yarns and aramid strength yarns together have elongation of less than 1.0 percent for a load of 300 lbf and/or elongation of less than 0.6 percent for a load of 200 lbf. Using relatively more fiberglass strength yarns and fewer aramid strength yarns can provide better resistance to cable contraction (thereby reducing EFL) and buckling, albeit at the cost of decreased flexibility and increased weight and bulk. That said, it is within the scope of the invention to employ all fiberglass strength yarns.

In exemplary, central loose optical-fiber cables, as between the fiberglass strength yarns and aramid strength yarns, the fiberglass strength yarns typically provide about 55 percent or more (e.g., 60-95 percent), such as 65-90 percent (e.g., 70-85 percent), of the combined strength-yarn tensile strength. Examples 1-3 (below) provide exemplary combinations of fiberglass strength yarns and aramid strength yarns that yield sufficient tensile strength.

Example 1

| yarns | number | tex per yarn | total tex | lbf per tex 1% elongation | load at 0.6% elongation | load at 1% elongation |
|---|---|---|---|---|---|---|
| fiberglass | 7 | 675 | 4725 | 0.05 | 153 | 256 |
| aramid | 3 | 161 | 483 | 0.16 | 47 | 77 |
| totals | | | 5208 | | 200 | 333 |

In Example 1 (above), as between the fiberglass strength yarns and aramid strength yarns, the fiberglass strength yarns provide about 91 percent of the combined strength-yarn tensile strength.

Example 2

| yarns | number | tex per yarn | total tex | lbf per tex 1% elongation | load at 0.6% elongation | load at 1% elongation |
|---|---|---|---|---|---|---|
| fiberglass | 4 | 675 | 2700 | 0.05 | 88 | 146 |
| aramid | 8 | 161 | 1288 | 0.16 | 124 | 206 |
| totals | | | 3988 | | 211 | 352 |

In Example 2 (above), as between the fiberglass strength yarns and aramid strength yarns, the fiberglass strength yarns provide about 68 percent of the combined strength-yarn tensile strength.

Example 3

| yarns | number | tex per yarn | total tex | lbf per tex 1% elongation | load at 0.6% elongation | load at 1% elongation |
|---|---|---|---|---|---|---|
| fiberglass | 3 | 675 | 2025 | 0.05 | 66 | 110 |
| aramid | 9 | 161 | 1449 | 0.16 | 139 | 232 |
| totals | | | 3474 | | 205 | 341 |

In Example 3 (above), as between the fiberglass strength yarns and aramid strength yarns, the fiberglass strength yarns provide about 58 percent of the combined strength-yarn tensile strength.

Excess fiber length (EFL) typically varies over the optical-fiber cable's operational temperatures (e.g., −40° C. to 40° C.). Including strength yarns helps to control excess fiber length (EFL), which is related to the interaction of contraction forces and core rigidity, not only during the buffering process but also at extreme temperatures (e.g., −20° C. or less). As noted, at 23° C., the present optical-fiber cable typically achieves excess fiber length (EFL) of less than 0.3 percent, more typically 0.2 percent (e.g., 0.1 percent or less).

Moreover, post-extrusion shrinkage (PES) often contributes to attenuation, such as during mid-span storage of optical-fiber buffer tubes and cables. Post-extrusion shrinkage, which can occur when a polymeric buffer tube and/or polymeric cable jacket is subjected to elevated temperatures, may cause unwanted increases in excess fiber length (EFL). Exemplary processes for controlling excess fiber length (EFL) and reducing post-extrusion shrinkage (PES) in loose buffer tubes is disclosed in commonly assigned U.S. Pat. No. 8,489,219, which is hereby incorporated by reference in its entirety.

The optical-fiber cables according to the present invention may contain either multimode optical fibers or single-mode optical fibers.

The optical fibers are typically configured as non-ribbonized optical fibers, such as discrete optical fibers loosely positioned within central buffer tube's central, annular space or as optical-fiber bundles. For example, bundles of optical fibers can be stranded (e.g., SZ, S, or Z stranded) and then bundled together using binders (e.g., helically or contra-helically wrapped binder yarns or binder tapes) to form an optical-fiber bundle. In exemplary embodiments of the present optical-fiber cable, several optical-fiber bundles may be positioned within the central buffer tube's annular space.

In one embodiment, the optical fibers employed in the present optical-fiber cables may be conventional standard single-mode fibers (SSMF). Suitable single-mode optical fibers (e.g., enhanced single-mode fibers (ESMF)) that are compliant with the ITU-T G.652.D recommendations are commercially available, for instance, from Prysmian Group (Claremont, N.C., USA). The ITU-T G.652 (November 2009) recommendations and each of its attributes (i.e., A, B, C, and D) are hereby incorporated by reference in their entirety.

In another embodiment, bend-insensitive single-mode optical fibers may be employed in the optical-fiber cables according to the present invention. Bend-insensitive optical fibers are less susceptible to attenuation (e.g., caused by microbending or macrobending). Exemplary single-mode glass fibers for use in the present optical-fiber cables are commercially available from Prysmian Group (Claremont, N.C., USA) under the trade name BendBright®, which is compliant with the ITU-T G.652.D recommendations. That said, it is within the scope of the present invention to employ a bend-insensitive glass fiber that meets the ITU-T G.657.A recommendations (e.g., the ITU-T G.657.A1 (November 2009) and the ITU-T G.657.A2 (November 2009) subcategories) and/or the ITU-T G.657.B recommendations (e.g., the ITU-T G.657.B2 (November 2009) and the ITU-T G.657.B3 (November 2009) subcategories). In this regard, the ITU-T G.657.A1 (November 2009) subcategory fully encompasses the former ITU-T G.657.A (December 2006) category, and the ITU-T G.657.B2 (November 2009) subcategory fully encompasses the former ITU-T G.657.B (December 2006) category. The ITU-T G.657.A/B recommendations are hereby incorporated by reference in their entirety.

In this regard, exemplary bend-insensitive single-mode glass fibers for use in the present invention are commercially available from Prysmian Group (Claremont, N.C., USA) under the trade names BendBrightXS® and BendBright-Elite™. BendBrightXS® optical fibers and BendBright-Elite™ optical fibers are not only compliant with both the ITU-T G.652.D and ITU-T G.657.A/B recommendations, but also demonstrate significant improvement with respect to both macrobending and microbending. As compared with such bend-insensitive single-mode optical fibers, conventional single-mode optical fibers typically do not comply with either the ITU-T G.657.A recommendations or the ITU-T G.657.B recommendations, but do typically comply with the ITU-T G.652 recommendations (e.g., the ITU-T G.652.D recommendations).

As set forth in commonly assigned U.S. Pat. No. 8,265,442, U.S. Pat. No. 8,145,027, U.S. Pat. No. 8,385,705, and International Patent Application Publication No. WO 2009/062131 A1, pairing a bend-insensitive glass fiber (e.g., Prysmian Group's single-mode glass fibers available under the trade name BendBright$^{XS}$®) and a primary coating having very low modulus achieves optical fibers having exceptionally low losses (e.g., reductions in microbend sensitivity of at least 10× as compared with a single-mode optical fiber employing a conventional coating system). The optical-fiber cables according to the present invention may employ the optical-fiber coatings disclosed in U.S. Pat. No. 8,265,442, U.S. Pat. No. 8,145,027, U.S. Pat. No. 8,385,705, and International Patent Application Publication No. WO 2009/062131 A1, which are hereby incorporated by reference in their entirety, with either single-mode optical fibers or multimode optical fibers.

In another embodiment, the optical fibers employed in the present optical-fiber cables are conventional multimode optical fibers having a 50-micron core (e.g., OM2 multimode optical fibers) and complying with the ITU-T G.651.1 recommendations. The ITU-T G.651.1 (July 2007) recommendations are hereby incorporated by reference in their entirety. Exemplary multimode optical fibers that may be employed include MaxCap™ multimode optical fibers (OM2+, OM3, or OM4), which are commercially available from Prysmian Group (Claremont, N.C., USA).

Alternatively, the present optical-fiber cables may include bend-insensitive multimode optical fibers, such as Max-Cap™-BB-OMx multimode optical fibers, which are commercially available from Prysmian Group (Claremont, N.C., USA). In this regard, bend-insensitive multimode optical fibers typically have macrobending losses of (i) no more than 0.1 dB at a wavelength of 850 nanometers for a winding of two turns around a spool with a bending radius of 15 millimeters and (ii) no more than 0.3 dB at a wavelength of 1300 nanometers for a winding of two turns around a spool with a bending radius of 15 millimeters.

In contrast, conventional multimode optical fibers, in accordance with the ITU-T G.651.1 recommendations, have macrobending losses of (i) no more than 1 dB at a wavelength of 850 nanometers for a winding of two turns around a spool with a bending radius of 15 millimeters and (ii) no more than 1 dB at a wavelength of 1300 nanometers for a winding of two turns around a spool with a bending radius of 15 millimeters. Moreover, as measured using a winding of two turns around a spool with a bending radius of 15 millimeters, conventional multimode optical fibers typically have macrobending losses of (i) greater than 0.1 dB, more typically greater than 0.2 dB (e.g., 0.3 dB or more), at a wavelength of 850 nanometers and (ii) greater than 0.3 dB, more typically greater than 0.4 dB (e.g., 0.5 dB or more), at a wavelength of 1300 nanometers.

The optical fibers typically have an outer diameter of between about 235 microns and 265 microns, although using optical fibers having a smaller diameter may be employed in the present optical-fiber cables.

By way of example, the component glass fiber may have an outer diameter of about 125 microns. With respect to the optical fiber's surrounding coating layers, the primary coating may have an outer diameter of between about 175 microns and 195 microns (i.e., a primary coating thickness of between about 25 microns and 35 microns), and the secondary coating may have an outer diameter of between about 235 microns and 265 microns (i.e., a secondary coating thickness of between about 20 microns and 45 microns). Optionally, the optical fiber may include an outermost ink layer, which is typically between two and ten microns.

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. An optical-fiber cable, comprising:
   a polymeric buffer tube defining an inner wall, and outer wall, and an annular space, and a plurality of optical fibers positioned within the polymeric buffer tube's annular space;
   a cable jacket surrounding the polymeric buffer tube and the plurality of optical fibers positioned within the polymeric buffer tube's annular space, the cable jacket defining an inner wall and an outer wall, wherein, at −40° C., total shrinkage stress of the cable jacket is 12 MPa or less; and
   a layer of stranded strength yarns positioned between the polymeric buffer tube's outer wall and the cable jacket's inner wall, the stranded strength yarns comprising both fiberglass strength yarns and aramid strength yarns, wherein (i) the strength yarns have elongation of less than 0.6 percent for a load of 200 lbf and (ii) the fiberglass strength yarns provide at least 55 percent of the combined strength-yarn tensile strength;
   wherein the optical-fiber cable has no rigid strength members.

2. The optical-fiber cable according to claim 1, wherein the cable jacket comprises a low-shrink polymer having a coefficient of thermal expansion (CTE) of $140\times10^{-6}/°$ C. or less at 20° C. and $75\times10^{-6}/°$ C. or less at −40° C.

3. The optical-fiber cable according to claim 1, wherein, at −40° C., the cable jacket has a coefficient of thermal expansion (CTE) of $100\times10^{-6}/°$ C. or less and modulus of 2000 MPa or less.

4. The optical-fiber cable according to claim 1, wherein, at 20° C., the cable jacket has modulus of 500 MPa or less.

5. The optical-fiber cable according to claim 1, wherein the cable jacket comprises linear low-density polyethylene (LLDPE) and/or polypropylene-ethylene-octene copolymers.

6. The optical-fiber cable according to claim 1, wherein total cable EFL is less than 0.3 percent at 23° C.

7. The optical-fiber cable according to claim 6, wherein total cable EFL is less than 0.2 percent at 23° C.

8. The optical-fiber cable according to claim 1, wherein the fiberglass strength yarns provide between 60 percent and 95 percent of the combined strength-yarn tensile strength.

9. The optical-fiber cable according to claim 8, wherein the fiberglass strength yarns provide between 65 percent and 90 percent of the combined strength-yarn tensile strength.

10. The optical-fiber cable according to claim 9, wherein the fiberglass strength yarns provide between 70 percent and 85 percent of the combined strength-yarn tensile strength.

11. The optical-fiber cable according to claim 1, wherein the fiberglass strength yarns consist of between 3 weight percent and 8 weight percent polymers.

12. The optical-fiber cable according to claim 1, wherein the strength yarns have elongation of less than 0.6 percent for a load of 200 lbf.

13. The optical-fiber cable according to claim 1, wherein the strength yarns have elongation of less than 1.0 percent for a load of 300 lbf.

14. The optical-fiber cable according to claim 1, wherein the strength yarns comprise water-swellable aramid strength yarns.

15. The optical-fiber cable according to claim 1, wherein the polymeric buffer tube comprises polypropylene and/or polybutylene terephthalate (PBT).

16. The optical-fiber cable according to claim 1, wherein the polymeric buffer tube comprises nucleated polyethylene, nucleated polypropylene, or a copolymer or a blend thereof.

17. The optical-fiber cable according to claim 1, wherein the polymeric buffer tube has (i) an inner diameter of 1.4 millimeters or less and (ii) an outer diameter of 3.0 millimeters or less.

18. The optical-fiber cable according to claim 1, wherein, at −40° C., total shrinkage stress of the cable jacket is 11 MPa or less.

19. An optical-fiber cable, comprising:
   a polymeric buffer tube defining an inner wall, and outer wall, and an annular space, and a plurality of optical fibers positioned within the polymeric buffer tube's annular space;
   a cable jacket surrounding the polymeric buffer tube and the plurality of optical fibers positioned within the polymeric buffer tube's annular space, the cable jacket defining an inner wall and an outer wall, wherein, at −40° C., total shrinkage stress of the cable jacket is 12 MPa or less; and
   a layer of stranded strength yarns positioned between the polymeric buffer tube's outer wall and the cable jacket's inner wall, the stranded strength yarns comprising both fiberglass strength yarns and aramid strength yarns, wherein (i) the strength yarns have elongation of less than 0.6 percent for a load of 200 lbf and (ii) the fiberglass strength yarns provide at least 55 percent of the combined strength-yarn tensile strength;
   wherein the cable jacket comprises a low-shrink polymer having a coefficient of thermal expansion (CTE) of $140\times10^{-6}/°$ C. or less at 20° C. and $75\times10^{-6}/°$ C. or less at −40° C.;
   wherein the fiberglass strength yarns provide between 60 percent and 95 percent of the combined strength-yarn tensile strength; and
   wherein the optical-fiber cable has no rigid strength members.

20. An optical-fiber cable, comprising:
   a polymeric buffer tube defining an inner wall, and outer wall, and an annular space, and a plurality of optical fibers positioned within the polymeric buffer tube's annular space;

a cable jacket surrounding the polymeric buffer tube and the plurality of optical fibers positioned within the polymeric buffer tube's annular space, the cable jacket defining an inner wall and an outer wall, wherein, at −40° C., total shrinkage stress of the cable jacket is 12 MPa or less; and a layer of stranded strength yarns positioned between the polymeric buffer tube's outer wall and the cable jacket's inner wall, the stranded strength yarns comprising both fiberglass strength yarns and aramid strength yarns, wherein (i) the strength yarns have elongation of less than 0.6 percent for a load of 200 lbf and (ii) the fiberglass strength yarns provide at least 55 percent of the combined strength-yarn tensile strength;

wherein the polymeric buffer tube has (i) an inner diameter of 1.4 millimeters or less and (ii) an outer diameter of 3.0 millimeters or less;

wherein the fiberglass strength yarns provide between 60 percent and 95 percent of the combined strength-yarn tensile strength; and wherein the optical-fiber cable has no rigid strength members.

\* \* \* \* \*